United States Patent [19]

Giddings

[11] Patent Number: 4,774,699
[45] Date of Patent: Sep. 27, 1988

[54] METHOD AND APPARATUS FOR POSITIONING A READ HEAD TO A SELECTED TRACK ON A RECORD DISC

[75] Inventor: Gary M. Giddings, Laguna Hills, Calif.

[73] Assignee: Discovision Associates, Costa Mesa, Calif.

[21] Appl. No.: 70,659

[22] Filed: Jul. 6, 1987

Related U.S. Application Data

[60] Continuation of Ser. No. 725,266, Apr. 19, 1985, abandoned, which is a division of Ser. No. 333,236, Dec. 21, 1981, abandoned.

[51] Int. Cl.[4] .................. G11B 17/22; H04N 5/76
[52] U.S. Cl. .................. 369/32; 369/111; 358/342; 360/72.2
[58] Field of Search .................. 369/32, 43–44, 369/46, 111; 360/72.2, 72.3, 73; 365/234; 358/311, 314, 342

[56] References Cited

U.S. PATENT DOCUMENTS

| 4,106,058 | 8/1978 | Romeas et al. | |
| 4,138,741 | 2/1979 | Hedlund et al. | 365/234 |
| 4,375,091 | 2/1983 | Dakin et al. | 369/32 |
| 4,498,158 | 2/1985 | Akiyama | 369/32 |

FOREIGN PATENT DOCUMENTS

| 0007199 | 1/1980 | European Pat. Off. |
| 2010550 | 6/1979 | United Kingdom . |
| 2034080 | 5/1980 | United Kingdom . |
| 2037460 | 7/1980 | United Kingdom . |
| 2056118 | 3/1981 | United Kingdom . |

OTHER PUBLICATIONS

SMPTE Journal, vol. 86, No. 2, Feb. 1977, pp. 80–83.
Patent Abstract of Japan, vol. 6, No. 137 (P-130-(1015), Jul. 24, 1982.

*Primary Examiner*—Aristotelis M. Psitos
*Attorney, Agent, or Firm*—Discovision Associates

[57] ABSTRACT

A method and apparatus for rapidly moving a reading beam of light radially relative to a rotating record disc, to impinge on a selected target track on the disc and recover information recorded on it. The apparatus first radially translates an optical system that directs the beam onto the disc at a relatively high speed until it is within a prescribed radial distance of the target track. Thereafter, an element of the optical system is controllably deflected such that the beam moves incrementally across a prescribed plurality of tracks during each disc revolution, until reaching the target track. The information recorded on each track includes a unique address signal, and movement of the beam relative to the disc is controlled according to the difference between the respective addresses of the track currently being scanned and the target track. If the apparatus fails to properly recover a track address signal, it estimates the address of the track currently being scanned, and updates its control of the beam's radial movement based on that estimate.

14 Claims, 6 Drawing Sheets

METHOD AND APPARATUS FOR POSITIONING A READ HEAD TO A SELECTED TRACK ON A RECORD DISC

This is a continuation of co-pending application Ser. No. 725,266 filed on Apr. 19, 1985, now abandoned, which is a Divisional of original parent application Ser. No. 333,236, now abandoned filed on Dec. 21, 1981.

BACKGROUND OF THE INVENTION

This invention relates generally to systems for recovering information from recording discs, and, more particularly, to a system that moves an information recovery device rapidly toward a selected target track on a recording disc to recover information recorded on it.

An example of a system of this particular type is described in a copending application for U.S. patent Ser. No. 295,629, filed Aug. 24, 1981 and entitled "Method and Apparatus for Information Retrieval from an Optically Readable Storage Medium," and assigned to the assignee of the present application. The disclosed apparatus directs a reading beam of light at a selected one of a plurality of substantially circular and concentric recording tracks on a rotatable recording disc. The intensity of the beam is modulated by the recorded information, which includes a unique address signal for each track and the apparatus detects the modulated beam to produce a playback signal indicative of the recorded information.

The apparatus includes means for selecting a particular target track to be scanned, along with a carriage motor and a movable mirror for moving the reading beam radially toward the target track. The apparatus further includes means for monitoring the playback signal to detect periodically the address of the track currently being scanned. This current address is compared to the target address, and the apparatus applies a prescribed sequence of drive signals to the carriage motor, depending on the remaining distance to the target track. The speed of the carriage motor is stepped successively downwardly as the reading beam reaches predetermined distance thresholds during carriage translation. During the last stage of carriage translation, the movable mirror increments the beam radially by one track spacing during each revolution of the disc, thereby "playing" into the target track.

Although the information recovery system described above has proven effective in rapidly moving a reading beam toward a selected target track, to recover information recorded on it, the system is not believed to operate as rapidly as is possible. The final stage of carriage translation, in which the beam plays into the target track, is believed to be particularly time consuming. There is therefore still a need for a system that can move an information recovery device even more rapidly toward a selected target track, to recover information recorded on it.

While the carriage motor moves the reading beam radially in the direction of the target track, the system disclosed in the aforementioned application periodically updates a storage register indicating the address of the particular track currently being scanned. In one disclosed embodiment, this updating is achieved by detecting successive track crossings and incrementing (or decrementing) the stored address with each crossing. Although this technique is generally effective when traversing tracks at relatively high rates, it has not performed well when traversing at relatively low rates because eccentricities in the recording disc can actually cause the beam to move relative to the disc in a radial direction opposite to that of the carriage motor.

A second disclosed embodiment of the aforementioned application updates the storage register each time it successfully detects an address in the playback signal. This technique is effective whenever the beam traverses tracks at a relatively low rate, but generally is not completely effective when the beam traverses at relatively high rates. This is because the reading beam frequently does not scan a single track for a long enough duration to recover the entire address recorded on it.

Whenever the system described above does not have an accurate indication of the track currently being scanned, and thus of the remaining radial distance to the target track, the system will likely not drive the reading beam toward the target track in an optimum fashion. It should therefore be appreciated that there is a need for a system that provides a more accurate indication of the current location of the information recovery device in relationship to the target track, such that the device can be moved as rapidly as possible in the direction of the target track, without overshooting it. The present invention fulfills this need.

SUMMARY OF THE INVENTION

The present invention is embodied in an apparatus and a related method for recovering information from a selected target track of a plurality of substantially circular and concentric recording tracks on a rotatable record disc. The information is recovered by an information recovery device that scans a selected radius of the disc while the disc is being rotated in a prescribed fashion. The recorded information can include, for example, a video signal with a unique address identifying each video frame, and the apparatus then operates to recover a selected target video frame recorded on a target track.

A separate video frame can be recorded on each track, in which case the disc is rotated at a constant angular velocity, regardless of the radius of the track being scanned. Alternatively, the video signal can be recorded with a more uniform recording density, in which case a variable number of frames are recorded on each track and the disc is rotated at an angular velocity that varies inversely with track radius. In this way, the disc moves at the same linear velocity past the information recovery device for all track radii. In the former case, the entire target track records the target video frame, whereas in the latter case, only a segment of the target track records the target frame.

The apparatus includes coarse positioning means for moving the information recovery device at a prescribed radial velocity relative to the disc, in the direction of the target track, and fine positioning means, operable after the coarse positioning means has moved the information recovery device into the vicinity of the target track, for moving the device incrementally from track to track until it reaches the target track.

In accordance with the invention, the fine positioning means moves the information recovery device incrementally across a prescribed plurality of tracks during each revolution of the disc, until it reaches the target track. This significantly reduces the time duration required to move the device to a position where it can recover the information recorded on the target track.

More particularly, the present invention has particular utility in a system for recovering a video signal recorded on an optical recording disc. The information recovery device includes means for directing a reading beam of light at the rotating disc, to produce a modulated beam having an intensity that varies in accordance with the recorded video signal. The information recovery device further detects the modulated beam, to produce a playback signal corresponding to the recorded signal. The coarse positioning means includes motor means for moving the disc radially relative to the reading beam, and the fine positioning means includes beam deflection means for controllably adjusting the point of impingement of the beam on the disc. The information recovery device also produces a tracking error signal indicating deviation of the beam from a selected track, and the fine positioning means further operates, at prescribed times, to controllably align the beam with the selected track.

The apparatus further includes address comparison means for determining when the reading beam has been moved to a position within a prescribed distance of the target track, and for disabling the coarse positioning means and enabling the fine positioning means at that time. In particular, the apparatus monitors the playback signal to detect periodically the unique address signal indicating the address of the track currently being scanned. The address comparison means updates an address register with each detected address signal, and compares that stored signal with a signal indicating the target frame address. When the difference between the two address signals drops below a prescribed threshold, the apparatus switches over from the coarse positioning means to the fine positioning means.

When a separate video frame is recorded on each track, a video frame address is essentially the same as a track address. In that case, the difference between the current address and the target address corresponds to the number of tracks remaining to be transversed by the reading beam. On the other hand, when a variable number of video frames is recorded on each track, the address difference does not correspond exactly to the number of tracks remaining to be traversed. In that case, the address difference can be transformed into an exact measure of track separation or alternatively can be used in its present form as a rough estimate of track separation.

In another aspect of the invention, the fine positioning means includes means for accelerating the reading beam relative to the disc, in the direction of the target track, means for counting the number of tracks crossed by the beam, and means for terminating relative movement of the beam after it has crossed a prescribed number of tracks. The means for accelerating, means for counting, and means for terminating operate successively a prescribed number of times until the beam reaches the target track.

In accordance with still another aspect of the invention, the apparatus determines when the reading beam fails to recover a recorded address signal and updates the address register with an estimate of the current address based on the radial speed of the beam relative to the rotating disc. Since this failure to recover address signals is a frequent occurrence when the beam traverses the disc at a relatively high radial velocity, this estimating procedure insures that the apparatus switches over from the coarse positioning means to the fine positioning means at an appropriate time.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
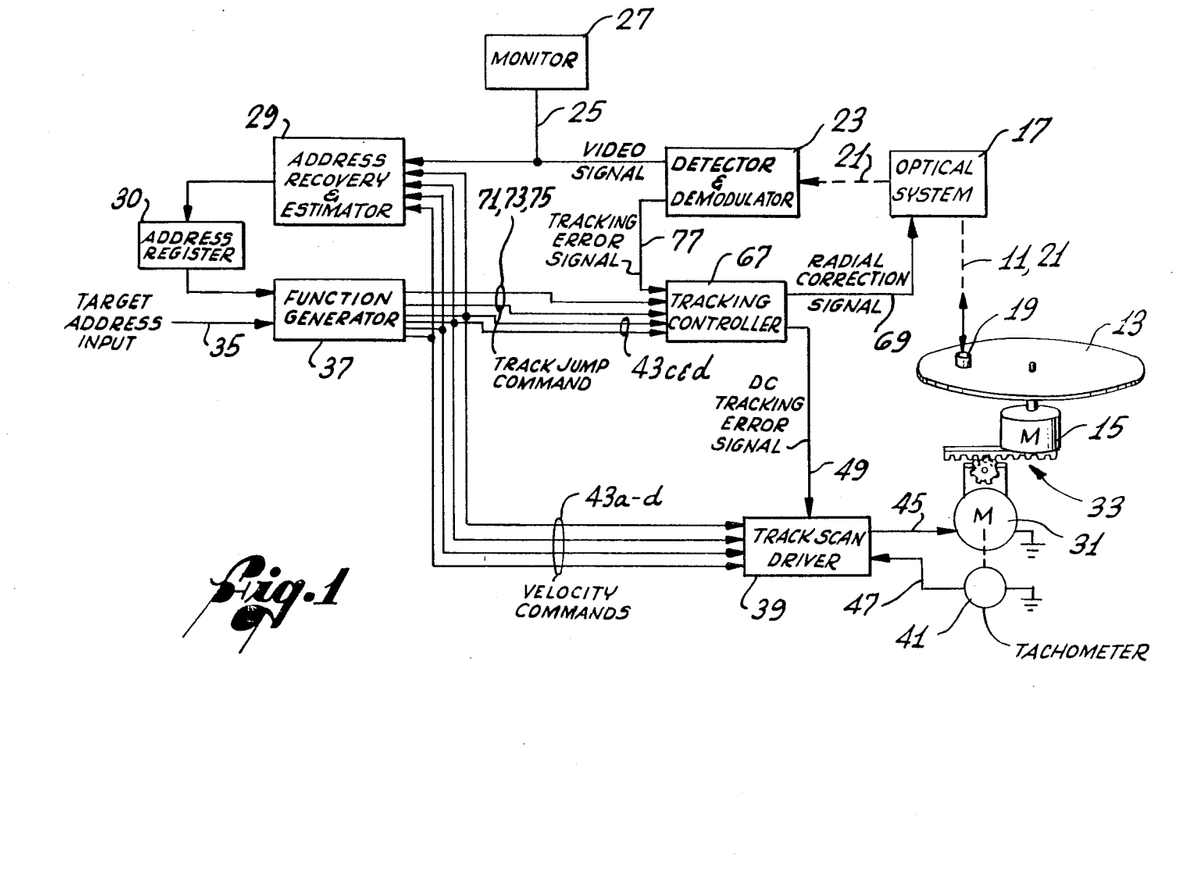
FIG. 1 is a simplified block diagram of a signal recovery apparatus embodying the principles of the present invention.

Referring now to the drawings, and particularly to FIG. 1, there is shown apparatus for moving a reading beam of light 11 in a radial direction relative to a rotating recording disc 13, to recover information from a selected target track on the disc. The disc includes a plurality of closely spaced, circular and concentric recording tracks, and each track records a video signal representing one video frame, with a unique frame or track address signal located in each vertical interval (i.e., two address signals per track).

The apparatus includes a spindle motor 15 for rotating the recording disc 13 at a prescribed constant angular velocity, and an optical system 17 and an objective lens 19 for focusing the reading beam 11 onto a selected track of the rotating disc. The reading beam is reflected by the disc, to produce a reflected beam 21 having an intensity that is modulated in accordance with the recorded information. The objective lens and optical system direct this reflected beam to a detector 23, which detects and demodulates the modulated intensity of the beam, to produce a baseband video signal corresponding to the recorded information. This video signal is coupled over line 25 to both a monitor 27 and an address recovery and estimator circuit 29. The monitor provides a real-time display of the video signal recovered from the target track, and the address recovery circuit detects the address signals in the successive vertical intervals of the video signal, using conventional techniques. The address recovery circuit then updates an address register 30 with each detected track address signal.

The apparatus further includes a coarse positioning system and a fine positioning system for controllably moving the reading beam 11 radially relative to the disc 13, toward the selected target track on the disc. The coarse positioning system includes a carriage motor 31 and appropriate gearing 33 for moving the beam at a selected one of two relatively high radial velocities (e.g., 100 and 500 tracks per disc revolution). The fine positioning system includes a movable mirror (not shown) located in the optical system 17 for controllably adjusting the beam's point of impingement on the disc over a relatively small range (e.g., about 50 tracks in either direction).

When a user desires to recover information recorded on a selected target track on the disc 13, he inputs a special target address code signal on line 35, indicating the target track's address. A function generator 37 compares this target address signal with the address signal currently being stored by the address register 30. In accordance with a prescribed algorithm that will be described below, the function generator determines the radial separation between the current track and the target track, and outputs appropriate control signals to controllably drive the carriage motor 31 and the movable mirror of the optical system 17 so as to move the reading beam 11 toward the target track. These control signals are sequenced such that the beam reaches the target track in a time substantially less than that achieved by prior apparatus of this kind.

In accordance with the invention, the carriage motor 31 is driven at a prescribed velocity (or sequence of velocities) until the reading beam 11 has been moved to within a prescribed number of tracks of the target track, after which the movable mirror of the optical system 17 is conditioned to incrementally jump the beam from one track to the next a plurality of times during each half revolution of the disc 13. This technique of moving the beam radially relative to the disc, and in particular moving it incrementally a prescribed plurality of times during each half revolution of the disc, substantially reduces the nominal time required to reach the target track and recover the information recorded on it.

More particularly, the coarse positioning system further includes a track scan driver 39 and a carriage motor tachometer 41 for controllably driving the carriage motor 31 in the prescribed fashion. The function generator 37 outputs a plurality of velocity commands for coupling over lines 43a-d to the track scan driver, which, in turn, controllably adjusts a dc drive signal coupled over line 45 to the carriage motor. The tachometer feeds back to the track scan driver over line 47 a carriage tachometer signal indicating the carriage motor's angular velocity, to enhance control of that velocity. Also, a dc tracking error signal is coupled to the track scan driver over line 49, to controllably move the carriage motor so as to reduce any steady state deflection of the movable mirror of the optical system 17.

Figure 4:
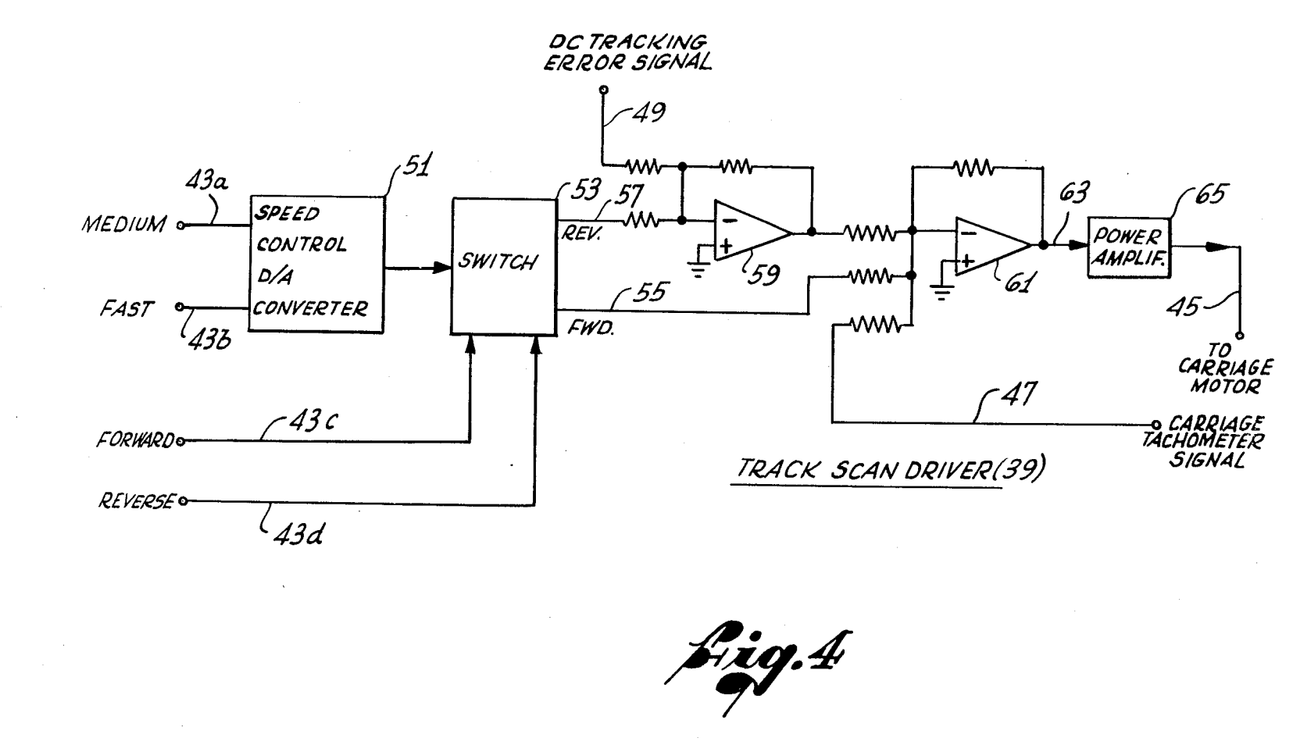
FIG. 4 is a block diagram of the track scan driver block in the apparatus of FIG. 1.

The track scan driver 39 is depicted in greater detail in FIG. 4. It receives the velocity commands on lines 43a-d from the function generator 37 and converts these signals to an appropriate dc drive signal for coupling over line 45 to the carriage motor 31. The driver includes a speed control digital-to-analog (D/A) converter 51 for converting two speed commands, received on lines 43a and 43b, to a corresponding dc voltage signal, and an analog switch 53 for directing the dc signal onto either a forward line 55 or a reverse line 57, in accordance with forward and reverse direction signals received on lines 43c and 43d from the function generator. A first inverting amplifier 59 sums the signal, if any, on the reverse line 57 with the dc tracking error signal supplied on line 49. A second inverting amplifier 61 sums the signal, if any, on the forward line 55 with both the output of the first amplifier 59 and the carriage tachometer signal supplied on line 47 from the tachometer 41. The output of the second amplifier 61 is coupled over line 63 to a power amplifier 65, which produces the carriage motor drive signal for output on line 45.

Referring again to FIG. 1, the fine positioning system further includes a tracking controller 67 for producing a radial correction signal for coupling over line 69 to the movable mirror of the optical system 17. Depending on the operating mode of the apparatus, this signal either maintains the reading beam 11 aligned with a selected target track, or incrementally jumps the beam from track to track while approaching the target track. The tracking controller receives a plurality of track jump commands supplied on lines 71, 73 and 75 from the function generator 37, along with a tracking error signal supplied on line 77 from the detector 23.

When the apparatus is operating in a mode in which the reading beam 11 is to be maintained in alignment with a selected track, the tracking controller 67 merely amplifies the tracking error signal and couples it directly to the movable mirror of the optical system 17, to form a conventional closed loop tracking servo for controllably aligning the beam with the track. On the other hand, when the apparatus is in a search mode in which the beam is to be moved incrementally from track to track, the tracking error signal is uncoupled from the movable mirror, and a prescribed sequence of pulses is coupled in its place. The tracking controller also outputs the dc tracking error signal for coupling over line 49 to the track scan driver 39, so as to reduce any steady state deflection of the movable mirror by moving the carriage motor 31 in the appropriate direction.

Figure 2:
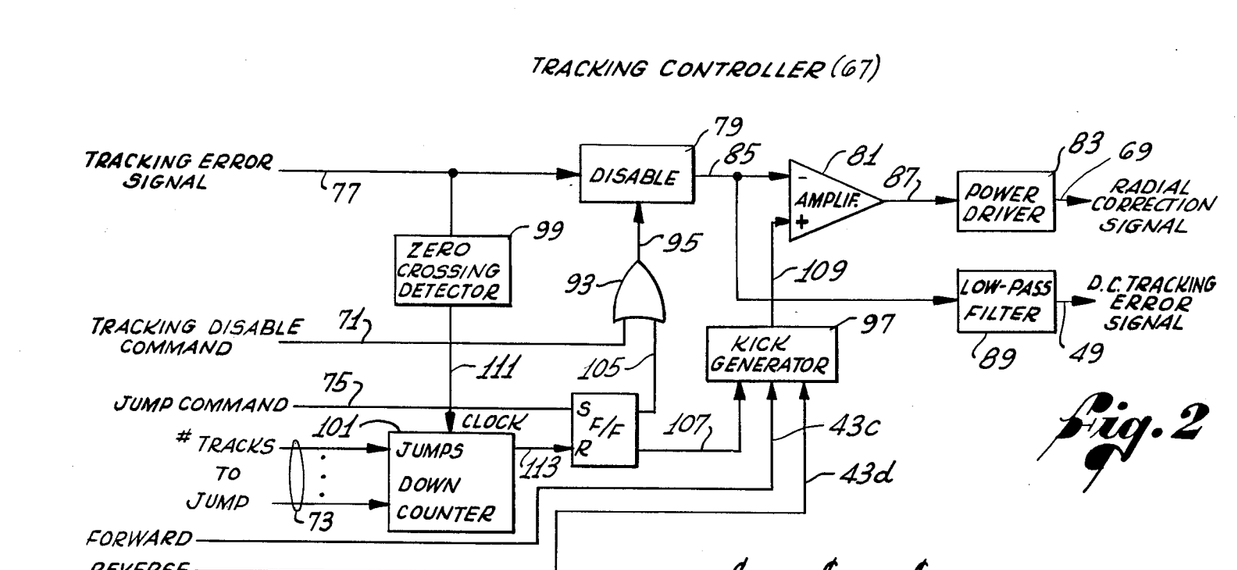
FIG. 2 is a block diagram of the tracking controller block in the apparatus of FIG. 1.

The tracking controller 67 is depicted in greater detail in FIG. 2. It includes a disable or switch circuit 79, an amplifier 81 and a power driver 83, for amplifying the tracking error signal supplied on line 77 and outputting it as the radial correction signal for coupling over line 69 to controllably position the movable mirror of the optical system 17 (FIG. 1). The tracking error signal is coupled through the disable circuit at all times except during the search mode of operation. The output of the disable circuit is coupled over line 85 to the negative input terminal of the amplifier, and the output of the amplifier is, in turn, coupled over line 87 to the power driver, which outputs the radial correction signal. The signal output on line 85 by the disable circuit is also coupled to a low-pass filter 89, to produce the dc tracking error signal for coupling on line 49 to the track scan driver 39 (FIG. 1).

Figure 3:
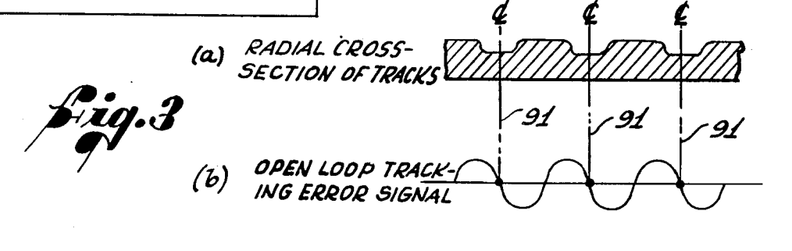
FIG. 3 is a fragmentary cross-sectional view of three tracks on the recording disc of FIG. 1, and showing the open loop tracking error signal produced while the reading beam traverses radially across the tracks.

At the beginning stage of each search mode of operation, in which the carriage motor 31 moves the reading beam 11 rapidly toward a target track, the tracking error signal experiences wide variations in level as the beam crosses the successive tracks. With reference to FIG. 3, which is a fragmentary cross-sectional view of the disc 13 showing three recording tracks, it will be observed that the open-loop tracking error signal is a large amplitude ac signal having a level of zero at the centerline 91 of each track. The disable circuit 79 uncouples the tracking error signal from the amplifier 81 at this time, to ensure that the apparatus does not attempt to controllably align the reading beam 11 with any track as it moves radially toward the target track.

In the search mode of operation, the coarse positioning system, which includes the carriage motor 31, operates whenever the distance between the target track and the present track exceeds a prescribed threshold, and the fine positioning system, which includes the movable mirror of the optical system 17, operates whenever this distance does not exceed the threshold. When the coarse positioning system is operating, a tracking disable command is coupled over line 71 from the function generator 37 to the tracking controller 67. This signal is coupled through an OR gate 93, and in turn over line 95 to the disable circuit 79, to uncouple the tracking error signal from the amplifier 81. The radial correction signal output by the tracking controller 67 on line 69 therefore has a level of zero, and the movable mirror remains stationary.

After the reading beam has been moved to a position within a prescribed number of tracks of the target track, the function generator 37 (FIG. 1) no longer outputs velocity commands to the track scan driver 39, and the carriage motor 31 is no longer driven at a relatively high speed. A prescribed time delay thereafter, the function generator terminates the tracking disable command previously coupled over line 71 to the tracking controller 67, so that the tracking error signal is again coupled through the tracking controller to form the tracking servo loop for controllably aligning the reading beam 11 with whatever recording track the beam arrives at. Thereafter, the tracking controller outputs a prescribed sequence of pulses to jump the reading beam incrementally from track to track until it reaches the target track.

To effect the incremental jumping, the tracking controller 67 includes a kick generator 97, a zero crossing detector 99, a junp-down counter 101, and a flip-flop 103. When the incremental jumping is to be initiated, a binary code indicating the number of tracks (e.g., 11 tracks) to be jumped during the next half revolution of the disc 13 is supplied on lines 73 from the function generator 37 and entered into the jumps-down counter. Simultaneously, a jump command signal supplied on line 75 from the function generator is coupled to the set direct input terminal of the flip-flop. This sets the Q output signal into the logical "1" state, and this signal is coupled over line 105 to the OR gate 93, and in turn over line 95 to the disable circuit 79, to open the tracking servo loop.

The $\bar{Q}$ output signal of the flip-flop 103 is is coupled over line 107 to the kick generator 97, which responds by outputing a single pulse signal for coupling over line 109 to the positive input terminal of the amplifier 81. This pulse signal is coupled through the amplifier and power driver 83 to the movable mirror of the optical system 17, to accelerate the reading beam 11 in the direction of the target track.

After the reading beam has been accelerated in the direction of the target track by the kick generator 97, the zero crossing detector 99 monitors the open loop tracking error signal (FIG. 3b) supplied on line 77 and outputs a clock pulse each time it detects a track crossing by the beam. These successive clock pulses are coupled over line 111 to the clock terminal of the jumps-down counter 101, to decrement the stored count, accordingly. When the count reaches zero, the counter outputs a reset pulse for coupling over line 113 to the reset direct terminal of the flip-flop 103.

The reset pulse coupled over line 113 to the reset direct terminal of the flip-flop 103 returns the $\bar{Q}$ output signal to the logical "1" state, which triggers the kick generator 97 to output a pulse of opposite polarity to that of the original pulse, thereby decelerating the movable mirror. The reset pulse simultaneously returns the Q output signal of the flip-flop to the logical "0" state, so that the tracking servo loop is no longer disabled by the disable circuit 79 and the loop can again function to controllably align the reading beam 11 with the track then being scanned. During this time, the dc tracking error signal is coupled on line 49 to the track scan driver 39, to controllably move the carriage motor 31 so as to reduce the deflection of the movable mirror.

The reading beam 11 preferably traverses the prescribed number of tracks in substantially less time than that required to rotate the disc 13 through a half revolution. In particular, the beam must traverse tracks at a speed greater than the speed at which track radius changes because of any disc eccentricity.

The kick generator 97 can include two monostable multivibrator or one-shot circuits, one triggered by a positive-going transition and the other by a negativr-going transition. The kick generator can further include appropriate gating circuits to ensure that the successive pulses it produces have the correct polarity to move the reading beam 11 in the direction of the target track. These gating circuits are responsive to the forward and reverse direction commands supplied on lines 43c and 43d, respectively. Examples of other kick generator circuits that can be appropriately modified to provide the recited functions are disclosed in a copending application assigned to the assignee of the present application, Ser. No. 130,904, filed Mar. 17, 1980, and entitled "Tracking System For Player," and in the patents cited in that application.

In an alternative embodiment, the tracking controller 67 radially accelerates and decelerates the reading beam 11 such that it moves by just one track spacing each time. This movement is repeated a plurality of times (e.g., 20 times) during each disc revolution, until the beam reaches the target track. The copending application, Ser. No. 130,904, referred to in the preceding paragraph, discloses circuitry for effecting such movement.

Figure 5:
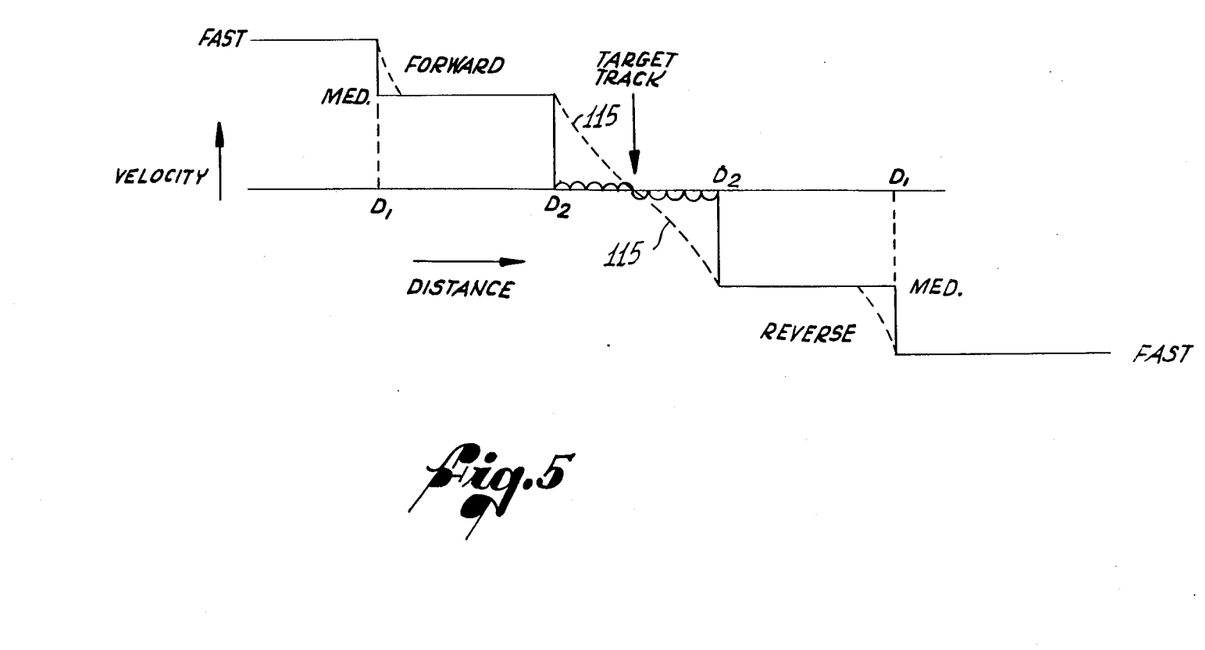
FIG. 5 is a graph of the radial velocity of the reading beam relative to the rotating disc, as a function of distance from the target track.

FIG. 5 is a schematic diagram depicting the radial velocity of the reading beam 11 relative to the disc 13, as a function of distance from the target track. As shown in the diagram, if the distance to the target track exceeds a prescribed threshold $D_1$ (e.g., 1700 tracks), the coarse positioning system, which includes the carriage motor 31, drives the beam at a fast speed toward the target track. The apparatus accomplishes this by coupling a fast speed control signal over line 43b from the function generator 37 to the track scan driver 39, which in turn couples a dc drive signal of the appropriate magnitude and direction to the carriage motor.

As soon as the beam crosses the $D_1$ distance threshold, the function generator 37 terminates the fast speed control signal and generates in its place a medium speed control signal for coupling over line 43a to track scan driver 39. This then drives the beam 11 at a medium speed toward the target track. The apparatus continues to drive the beam at that medium speed until the beam has been moved to within a prescribed distance threshold $D_2$ (e.g., 350 tracks) of the target track, at which time the function generator terminates the medium speed control signal and the apparatus permits the carriage motor 31 to slow to a stop, as indicated by the dotted line 115. The selection of the particular distance thresholds $D_1$ and $D_2$ is a matter of mere design choice and should be made in accordance with prescribed characteristics of the apparatus such as the size and inertia of the carriage motor, the maximum deflection of the movable mirror, etc.

Special considerations must be made in a system where the video signal is recorded on the disc 13 with a uniform recording density. Since a variable number of frames are recorded on each track, the difference between the address of the video frame currently being scanned and the address of the target frame does not correspond exactly to the number of tracks remaining to be traversed. This frame address difference can be suitably transformed into a precise measure of track separation based on the numbers of frames per track at the pertinent radii. Alternatively, the frame address difference can be used in its present form as a rough estimate of track separation. Also, since the disc must be rotated at an angular velocity inversely proportional to the radius of the track being scanned, the apparatus preferably limits the velocity of the carriage motor 31 in accordance with the capability of the spindle motor 15 to speed up or slow down.

After the carriage motor 31 has stopped, the tracking servo loop maintains the reading beam 11 aligned with some track in the vicinity of the target track. Thereafter, based on the remaining distance and direction to the target track, the apparatus incrementally jumps the beam toward the target track in a prescribed fashion. If, for example, the beam comes to rest at a track located 69 track spacings short of the target track, the fine positioning system incrementally jumps the beam by eleven track spacings during each of the first six half revolutions of the disc 13, and by three track spacings during the next half revolution, to finally arrive at the target track. Updated track address information is recovered from the disc twice during each revolution, i.e., when the reading beam scans the vertical interval portion of the recorded video signal.

After the reading beam 11 finally reaches the target track, the apparatus can operate, for example, in a stop-motion mode, to scan the track repeatedly and display the recovered video signal. If the successive tracks are arranged in a spiral pattern, the apparatus must jump the beam backward by one track spacing during each disc revolution, preferably during a vertical interval. Suitable apparatus for effecting this track jumping is disclosed in the aforementioned copending application, Ser. No. 130,904, which is incorporated by reference, and in the patents cited in that application.

In an alternative embodiment of the invention, the tracking controller 67 is adapted to jump the reading beam 11 in only one direction. In that embodiment, the distance thresholds are skewed on opposite sides of the target track such that the carriage motor 31 always comes to a stop with the beam impinging on a track located on the appropriate side of the target track. Also, if the beam is initially located within a prescribed number of tracks (e.g., 10 tracks) of the target track, on the side from which track jumping is not possible, the beam simply "plays" into the target track at a rate of one track per revolution.

Figure 6:
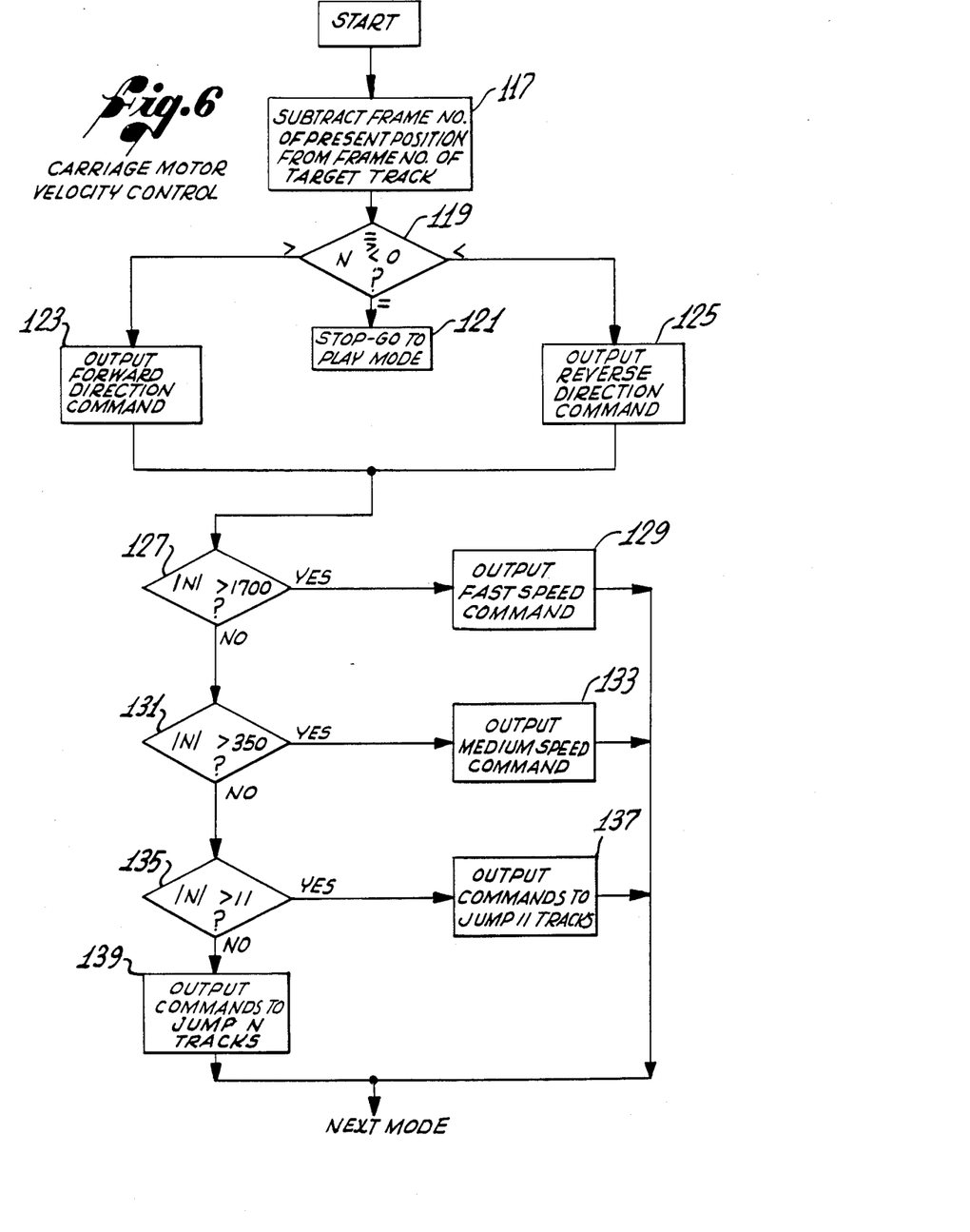
FIG. 6 is a flowchart implemented by the apparatus of FIG. 1, for controllably varying the radial speed and direction of the reading beam relative to the disc.

FIG. 6 is a simplified flowchart of the process steps implemented by a microprocessor in the function generator 37 in outputting the velocity and track jump commands when the apparatus is operating in the search mode. The function generator implements the process once during each half revolution of the recording disc 13, immediately after the address recovery circuit 29 detects an address signal in the vertical interval of the recovered video signal. In an initial step 117, the current track address signal is subtracted from the address of the target track, to produce a number N indicating the number of tracks and direction to the target track. Step 119 then compares this number N to zero. If N equals zero, step 121 instructs the microprocessor to proceed to the play mode of operation. If the number N exceeds zero, step 123 outputs a forward direction command on line 43c, whereas if N is less than zero, step 125 outputs a reverse direction command on line 43d.

If a direction command is output by either of steps 123 or 125, the program proceeds to step 127, in which the absolute value of the number N, i.e., $|N|$, is compared a distance threshold of 1700. If $|N|$ exceeds this threshold, step 129 outputs a fast speed command signal for coupling over line 43b to the track scan driver 39. On the other hand, if $|N|$ does not exceed the 1700 threshold, the program proceeds to step 131, in which $|N|$ is compared to a distance threshold of 350.

If $|N|$ exceeds the threshold, step 133 outputs a medium speed command for coupling over line 43a to the track scan driver 39. On the other hand, if $|N|$ does not exceed the 350 threshold, the program proceeds to step 135, in which $|N|$ is compared to a distance threshold of 11. If $|N|$ exceeds the threshold 11, step 137 outputs a jump command for coupling on line 75 to the tracking controller 67, and simultaneously outputs a binary code for coupling on lines 73 to the tracking controller indicating that the beam should jump by 11 track spacings. On the other hand, if $|N|$ does not exceed the threshold 11, step 139 outputs a jump command on line 75 and simultaneously outputs a binary code on lines 73 indicating that the beam should jump by $|N|$ track spacings. After the respective commands are output by either of the steps 129, 133, 137, or 139, the program proceeds to the next mode of operation.

As previously mentioned, the address register 30 (FIG. 1) stores the most recently detected track address. This address is ordinarily updated twice during each revolution of the disc 13, i.e., after the reading beam 11 scans the segment of a track recording the vertical interval portion of the video signal. Since the beam sometimes traverses tracks at a relatively high velocity, and since the recorded address code ordinarily includes about 30 to 40 binary bits of information, the address frequently is not properly detected. When this has occurred in the past, prior systems typically continued to move the reading beam at the same velocity as before the address was missed. This frequently caused the beam to overshoot the target track, thereby increasing substantially the time required to reach the target track and recover the information recorded on it.

In accordance with another aspect of the invention, the apparatus determines whenever it has failed to properly detect a recorded address signal and updates the address register 30 with an estimate of the address of the track currently beng scanned by the reading beam 11. This substantially reduces the likelihood that the beam traverses far beyond the target track, and therefore reduces the average time the apparatus requires to reach the target track and recover the information recorded on it.

Figure 7:
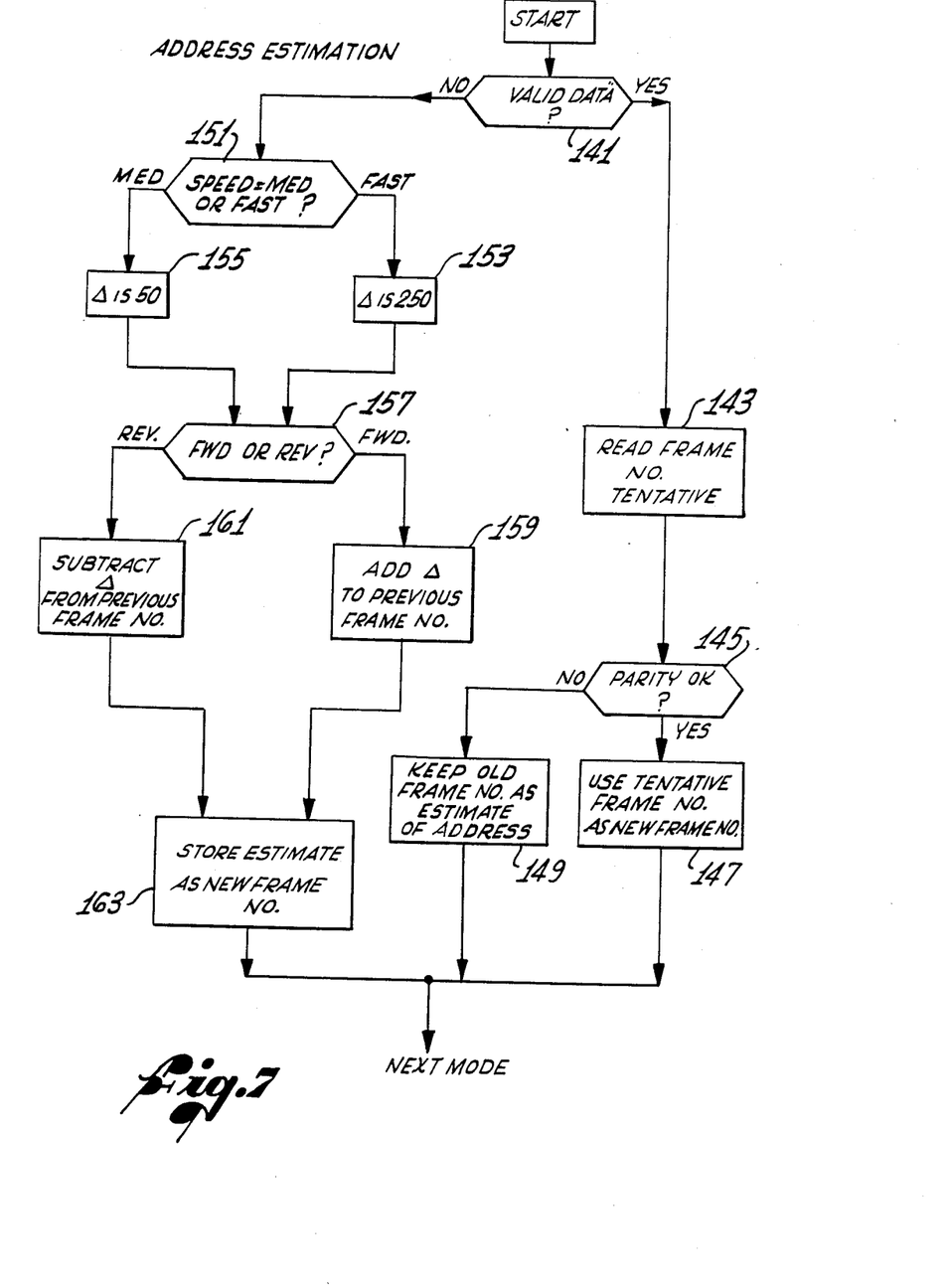
FIG. 7 is a flowchart implemented by the address recovery and estimator circuit in the apparatus of FIG. 1, for updating the address register indicating the address of the track currently being scanned.

FIG. 7 is a simplified flowchart of the process steps implemented by the address recovery and estimator circuit 29 (FIG. 1), in updating the address register 30 with either the most-recently detected current track address or an estimate of the current address. In an initial step 141, each sequence of detected data bits is monitored to determine whether or not it corresponds to a properly recovered address signal. Preferably, each address signal contains about 33 bits of data, includng 20 address bits, one parity bit, and 12 "framing" bits, half at the beginning of the signal and half at the end. In particular, step 141 determines whether or not the framing bits correspond to a prescribed code. If they do, the data is presumed to be valid.

If step 141 determines the sequence of data bits to be valid, the program proceeds to step 143, where the 20 address bits are tentatively stored as the correct address of the track then being scanned. Thereater, step 145 checks the parity of the address bits using the detected parity bit. If parity is correct, step 147 updates the address register with the 20 address bits being tentatively stored. If parity is incorrect, the tentatively stored address bits are discarded, and step 149 retains the previous address in the address register 30. Ideally, if the program had sufficient time, the previous address would instead be updated with an estimate of the current address.

If step 141 determines the sequence of data bits to be invalid, then an address signal has not been properly recovered and the program proceeds to a series of steps that provide an estimate of the current track address. Specifically, step 151 determines whether a fast speed control signal or a medium speed control signal is being coupled to the track scan driver 39. If a fast signal is being coupled, step 153 defines a variable D to be 250, whereas, if a medium signal is is being coupled, step 155 defines D to be 50.

Thereafter, step 157 determines whether a forward direction signal or a reverse direction signal is being coupled to the track scan driver 39. If a forward direction signal is being coupled, step 159 adds the value of D (i.e., either 50 or 250) to the previously stored address, to produce an estimate of the track currently being scanned. On the other hand, if a reverse direction signal is being coupled, step 151 subtracts the value of D from the previously stored address, to produce a curent track address estimate. Finally, step 163 stores the address estimate produced in either of steps 159 or 161 in the address register 30, as the current track address.

The track address estimation procedure described above is followed only when the carriage motor 31 is driving the reading beam 11 at a medium or fast speed toward the target track. It is not used thereafter, when the movable mirror of the optical system 17 is incrementally jumping the beam from track to track. If the address recovery circuit 29 fails to properly recover an address signal at that time, the previously detected address is retained in the register 30.

It should be appreciated from the foregoing description that the present invention provides an improved apparatus for rapidly moving an information recovery device toward a prescribed target track on a rotating recording disc, to recover informatin recorded on it. The apparatus operates in substantially reduced time by first translating the information recovery device radially at a relatively high speed relative to the rotating disc, and then incrementally jumping the device from track to track a plurality of times during each disc revolution, until reaching the target track. Also, whenever the apparatus fails to properly recover a track address signal, it estimates the address of the track currently being scanned, and updates its control of the information recovery device's movement based on that estimate.

Although the method and apparatus of the invention have been described in detail with reference to the presently preferred embodiment, it should be understood by those of ordinary skill in the art that various modifications can be made without departing from the spirit and scope of the invention. Accordingly, the invention is not intended to be limited, except as by the appended claims.

I claim:

1. Apparatus for recovering recorded information from a target track of a plurality of recorded information tracks on an information carrier, comprising:
   means for rotating the carrier;
   read head means for providing a scanning point for scanning the carrier to recover the recorded information from the carrier;
   means for selecting the target track;
   means for moving said scanning point towards said selected target track;
   means for determining when said scanning point has at least reached a predetermined position relative to said selected target track, and for determining the exact number, defined as N, of tracks between the actual position of said scanning point at the point when it is determined that said scanning point has at least reached said predetermined position, and said selected target track; and,
   means, responsive to said determining means, for controlling said moving means to move said scanning point, in one increment, during less than a single revolution of the carrier, across said determined, exact number N of tracks to arrive precisely at said selected target track, even when said determined number N is greater than one.

2. The apparatus as set forth in claim 1, wherein said predetermined position is located a predetermined number M, greater than three, of tracks from said selected target track.

3. The apparatus as set forth in claim 1, wherein said controlling means functions to move said scanning point said one increment during less than a half-revolution of the carrier.

4. The apparatus as set forth in claim 1, wherein said recorded information includes location identification data, and further including means, operatively associated with said determining means, for periodically extracting said location identification data from said recorded information.

5. The apparatus as set forth in claim 4, wherein said periodically extracting means is disabled during said one increment movement of said scanning point.

6. The apparatus as set forth in claim 1, wherein said moving means comprises coarse means for moving said scanning point to at least said predetermined position, and fine means for moving said scanning point across said exact number N of tracks to arrive precisely at said selected target track.

7. A method for recovering recorded information from a selected target track of a plurality of recorded information tracks on an information carrier, the recorded information including location identification data, said method including the steps of:
   rotating the carrier;
   scanning a reading beam of radiation upon the carrier to produce a reflected beam which is modulated by the recorded information on the tracks;
   selecting the target track, to thereby initiate a search operation;
   moving said reading beam across the carrier towards said selected target track;

monitoring said modulated, reflected beam to periodically detect said location identification data, during said search operation;

intermittently redetermining, in response to said monitoring step, the position of said reading beam relative to said selected target track;

determining, in response to said intermittently redetermining step, when said reading beam has reached a predetermined position relative to said selected target track; and, in response to said determining step, moving said reading beam, in one increment, during less than a single revolution of the carrier, from said predetermined position to said selected target track, during less than a single revolution of the carrier.

8. The method as set forth in claim 7, wherein said moving step executed in response to said determining step, is executed during less than a half-revolution of the carrier.

9. The method as set forth in claim 7, wherein said monitoring step is not executed during said moving step executed in response to said determining step.

10. The method as set forth in claim 7, wherein said predetermined position is less than a predetermined number M, greater than three, of tracks from said selected target track.

11. The method as set forth in claim 7, wherein said moving step executed in response to said determining step, comprises the steps of:

calculating the exact number of tracks, defined as N, between said selected target track and said reading beam at the time when it is determined, via said determining step, that said reading beam has reached said predetermined position;

presetting said exact number N into a decrementing counter;

moving said beam towards said selected target track;

detecting when said reading beam moves across a track;

decrementing said counter by one count each time it is detected, in said detecting step, that said reading beam moves across a track;

detecting when the count in said decrementing counter reaches zero; and, terminating said moving step, in response to said detecting step.

12. A method for recovering recorded information from a selected target track of a plurality of recorded information tracks on an information carrier, the recorded information including location identification data, said method including the steps of:

rotating the carrier;

scanning a reading beam of radiation upon the carrier to produce a reflected beam which is modulated by the recorded information on the tracks;

selecting the target track, to thereby initiate a search operation;

moving said reading beam across the carrier towards said selected target track;

monitoring said modulated, reflected beam to periodically detect said location identification data, during said search operation;

determining, in response to said monitoring step, when said reading beam is positioned at a location less than a predetermined number M, greater than three, of tracks from said selected target track;

further determining, in response to the firstrecited determining step, the exact number, defined as N, of tracks between said location and said selected target track; and, in response to said further determining step, moving said reading beam from said location, in one increment, during less than a single revolution of the disc, across said determined, exact number N of tracks, to arrive precisely at said selected target track, even when said determined, exact number N is greater than one.

13. The method as set forth in claim 12, wherein said moving step executed in response to said further determining step is executed during less than a half-revolution of the carrier.

14. The method as set forth in claim 12, wherein said moving step executed in response to said further determining step, comprises the steps of:

presetting said determined, exact number N into a decrementing counter;

detecting when said reading beam moves across a track;

decrementing said counter by one count each time it is detected, in said detecting step, that said reading beam moves across a track;

detecting when the count in said decrementing counter reaches zero; and, terminating said moving step, in response to said detecting step.

* * * * *